(12) United States Patent
Delmastro

(10) Patent No.: US 6,354,623 B1
(45) Date of Patent: Mar. 12, 2002

(54) AUTOMOTIVE TRIM PANEL

(75) Inventor: John A. Delmastro, Washington, MI (US)

(73) Assignee: Textron Automotive Company Inc., Troy, MI (US)

( * ) Notice: Subject to any disclaimer, the term of this patent is extended or adjusted under 35 U.S.C. 154(b) by 0 days.

(21) Appl. No.: 09/631,763

(22) Filed: Aug. 3, 2000

(51) Int. Cl.⁷ .............................................. B60R 21/20
(52) U.S. Cl. ..................... 280/732; 280/728.3; 180/90; 296/70
(58) Field of Search ............................. 280/732, 728.3; 180/90; 296/70

(56) References Cited

U.S. PATENT DOCUMENTS

| | | | |
|---|---|---|---|
| 4,455,338 A | * 6/1984 | Henne | 428/137 |
| 4,646,879 A | 3/1987 | Mahler et al. | 180/90 |
| 4,733,739 A | * 3/1988 | Lorenz et al. | 180/90 |
| 4,964,653 A | 10/1990 | Parker | 280/732 |
| 5,273,310 A | * 12/1993 | Terai | 280/732 |
| 5,277,443 A | 1/1994 | Grant et al. | 280/732 |
| 5,311,960 A | * 5/1994 | Kukainis et al. | 180/90 |
| 5,354,114 A | 10/1994 | Kelman et al. | 296/192 |
| 5,358,300 A | 10/1994 | Gray | 296/192 |
| 5,536,351 A | 7/1996 | Rheinlander et al. | 156/212 |
| 5,544,912 A | 8/1996 | Sommer | 280/728.3 |
| 5,560,646 A | 10/1996 | Gray et al. | 280/728.3 |
| 5,564,515 A | 10/1996 | Schambre | 180/90 |
| 5,564,731 A | 10/1996 | Gallagher et al. | 280/728.3 |
| 5,685,598 A | * 11/1997 | Inoue et al. | 296/194 |
| 5,762,395 A | * 6/1998 | Merrifield et al. | 296/203 |
| 6,071,591 A | * 6/2000 | Dausch | 428/132 |
| 6,110,037 A | * 8/2000 | Yoshinaka | 454/143 |
| 6,250,678 B1 | * 6/2001 | Yoshinaka et al. | 280/752 |

* cited by examiner

Primary Examiner—Brian L. Johnson
Assistant Examiner—Deanna Draper
(74) Attorney, Agent, or Firm—Hayes, Soloway, Hennessey, Grossman & Hage PC

(57) ABSTRACT

An automotive trim panel is disclosed having an airbag door and at least one duct. The trim panel comprises a first retainer, having an aperture for deployment of an airbag, and a second retainer having an airbag door. When the first retainer and the second retainer are assembled, the airbag door of the second retainer is received in the aperture of the first retainer. Furthermore, at least one duct is formed when the first retainer and the second retainer are assembled.

38 Claims, 4 Drawing Sheets

AUTOMOTIVE TRIM PANEL

TECHNICAL FIELD

The present invention relates generally to automotive trim panels and, more particularly, automotive trim panels having integrated airbag doors and ducts.

BACKGROUND OF THE INVENTION

Automotive trim panels typically include a substrate structure having a substantially rigid construction. The substrate provides the structural support for instruments, switches, accessories and may also support defrost/ventilation ducts.

U.S. Pat. No. 5,560,646 discloses an airbag door arrangement wherein the airbag door has a hinged end that is clamped to an instrument panel substrate by a frame disposed beneath the substrate and a reinforcing bar positioned on top of the substrate. The airbag door is clamped between the substrate and frame by means of a plurality of fasteners extending therethrough. The '646 Patent does not disclose a duct, for example, for routing air or wires.

U.S. Pat. No. 4,646,879 describes an instrument panel substrate for an automotive vehicle that attaches to a cross-car structural beam. The underside of the instrument panel substrate contains at least two ribs that extend across the width of the car and mate with the cross-car structural beam. When the ribs of the instrument panel substrate are sealed to the cross-car structural beam the free volume defines an air duct that communicates with the windshield defroster nozzles. The '879 Patent does not disclose an airbag door arrangement.

What is needed is an automotive interior trim panel having an integral airbag door that also includes one or more integral ducts.

SUMMARY OF THE INVENTION

An automotive trim panel having an airbag door and at least one duct. The trim panel of the present invention comprises a first retainer, having an aperture for deployment of an airbag, and a second retainer having an airbag door. When the first retainer and the second retainer are assembled, the airbag door of the second retainer is received in the aperture of the first retainer. Furthermore, at least one duct is formed when the first retainer and the second retainer are assembled.

During assembly, the second retainer is fitted to the inner surface of the first retainer. The second retainer is fitted to the inner surface of the first retainer such that the airbag door portion of the second retainer is received in the aperture of the first retainer.

During assembly, when the second retainer is fitted to the inner surface of the first retainer, a channel in the second retainer is also substantially enclosed about at least a portion of its length by the first retainer therein forming a duct between the first retainer and the second retainer.

DETAILED DESCRIPTION OF THE INVENTION

Figure 1:
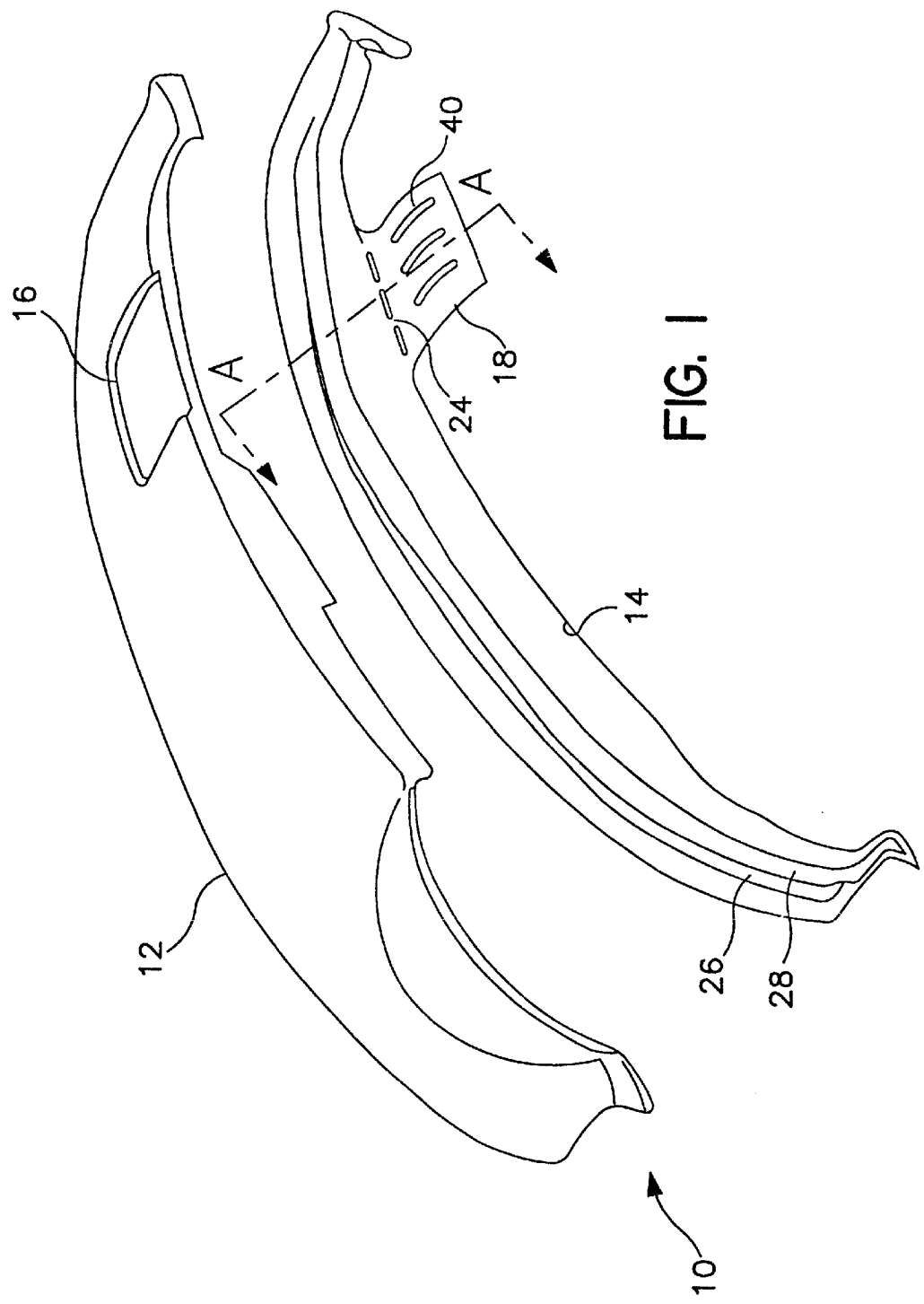
FIG. 1 is an exploded view of an automotive instrument panel substrate of the present invention.

FIG. 1 illustrates, in exploded view, an automotive instrument panel substrate 10 comprising first and second retainers, preferably in the form of an upper retainer 12 and a lower retainer 14, respectively. Upper retainer 12 further comprises an aperture 16 through which an air bag may be deployed. As shown, aperture 16 in upper retainer 12 is preferably rectangular and preferably fully defined by upper retainer 12, that is, aperture 16 is fully contained within the confines of upper retainer 12. Lower retainer 14 comprises an airbag door portion 18, preferably delineated by hinge line 24. Lower retainer 14 further comprises channels 26 and 28.

Figure 2:
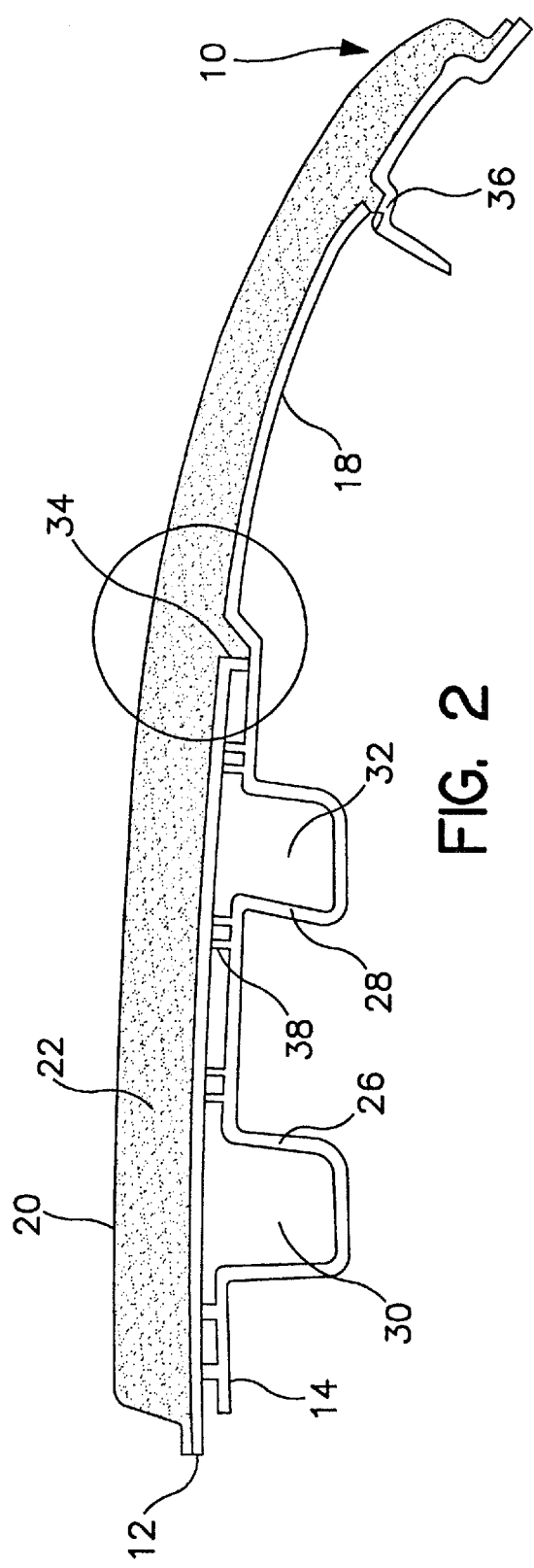
FIG. 2 illustrates the assembled instrument panel substrate in a cut-away view.

As illustrated in cut-away view in FIG. 2, the instrument panel substrate 10 preferably may be part of an instrument panel assembly further comprising a foam layer 22 adhered to the upper surface of upper retainer 12, and an outer skin layer 20 adhered to foam layer 22. It is preferred that skin layer 20 is adhered to upper retainer 12 by foam layer 22. Additionally, upper surface of airbag door portion 18 of lower retainer 14 also preferably contains foam layer 22 and outer skin layer 20 such that foam layer 22 and skin layer 20 preferably are continuous over the entire upper surface of instrument panel substrate 10 and conceal the resulting airbag door.

Both upper retainer 12 and lower retainer 14 are preferably formed by injection molding of plastic. However, any suitable forming process may be used. This includes, but is not limited to, all forms of injection molding (e.g. high pressure, low pressure injection molding, injection compression, stamping, coining, gas assist), compression molding, reaction injection molding, blow molding, thermoforming, and vac-forming.

Preferably both upper retainer 12 and lower retainer 14 are formed using a polymer blend of polyphenylene oxide (PPO) and polystyrene (PS), and more preferably, General Electric's Noryl®. However, any suitable materials may be used. This includes, but is not limited to, materials containing polycarbonate (PC), acrylonitrile-butadiene-styrene (ABS), styrene-maleic-anhydride (SMA), polyurethane (PU) and polypropylene (PP).

While upper retainer 12 and lower retainer 14 may be constructed of the same material, lower retainer 14 may alternately be constructed of a material exhibiting a greater low temperature flexibility, thereby enhancing the low temperature performance of the airbag door portion 18. Preferred materials of improved low temperature flexibility, i.e. materials having a lower glass transition temperature (Tg) and/or a lower flexural modulus, include elastomers made of thermoplastic and thermoset polyurethanes, rubber modified polyolefms, and polyesters. Additionally, lower retainer 14 may include a blowing agent, such as azobisformamide, providing the final product with a greater insulating capacity.

As illustrated in FIG. 2, when lower retainer 14 is assembled with upper retainer 12, airbag door portion 18 is received by aperture 16 to comprise airbag door of instrument panel substrate 10. Furthermore, assembling upper retainer 12 and lower retainer 14 encloses channels 26 and 28, therein forming ducts 30 and 32.

Preferably airbag door portion 18 of lower retainer 14 is sized to fit within and occupy at least a portion of aperture 16 prior to airbag deployment, more preferably, airbag door portion 18 is sized to be substantially coextensive with aperture 16. Additionally, it is preferred that airbag door portion 18 and upper retainer 12 adjacent to aperture 16 are substantially coplanar. When airbag door portion 18 is substantially coextensive with aperture 16 and substantially coplanar with upper retainer 12, the foam layer 22 thereover will be of substantially the same thickness as adjacent regions.

In the preferred embodiment, coplanarity of airbag door portion 18 and upper retainer 12 adjacent aperture 16 is achieved by a positive displacement of airbag door portion 18 relative and normal to lower retainer 14. The displacement of airbag door portion 18 preferably coincides with hinge line 24. Alternately the displacement of airbag door portion 18 may occur on either side of hinge line 24.

Airbag door portion 18 may be supported against downward deflection resulting from objects placed on the instrument panel substrate 10 and forces applied by occupants of the vehicle in the general region of the airbag door. Preferably support for airbag door portion 18 comprises a lip 36 disposed on the interior perimeter of aperture 16, wherein lip 36 is negatively displaced from the upper surface of upper retainer 12 a distance approximately equal to the thickness of airbag door portion 18. In the most preferred embodiment, lip 36 is continuous around three sides of the perimeter of aperture 16 and absent along the side of aperture 16 corresponding to hinge line 24 of airbag door portion 18. It is further preferred that, when assembled, airbag door portion 18 is in intimate contact with lip 36 as to eliminate any need for additional sealing of the joint line to prevent foam material 22 from exiting there past. In alternate embodiments, lip 36 may be discontinuous around the three sides of the perimeter of aperture 16. In another alternate embodiment, lip 36 may disposed only on the forward edge of aperture 16, therein supporting only the distal edge of airbag door portion 18. In still another alternate embodiment, lip 36 may comprise tabs extending from the bottom surface of upper retainer 12 about the perimeter of aperture 16.

The edge of aperture 16 proximal to hinge line 24 of airbag door portion 18 preferably comprises a downward standing flange 34. Preferably downward standing flange 34 is continuous about the entire edge of aperture 16 proximal to hinge line 24. Preferably also, downward standing flange 34 is in intimate contact with the lower retainer 14 when instrument panel substrate 10 is assembled. In the preferred embodiment, downward standing flange 34 contacts lower retainer 14 proximal to airbag door portion 18 such that hinge line 24 is disposed on the interior of aperture 16 relative to downward standing flange 34. In an alternate embodiment downward standing flange 34 contacts lower retainer 14 proximal to airbag door portion 18 along hinge line 24.

Hinge line 24 is preferably configured to provide opening of airbag door portion 18 about a predetermined path. Preferably hinge line 24 comprises a line of mechanical weakness, whereby airbag door portion 18 will tend to pivot about the line of mechanical weakness. In this manner the opening characteristics of airbag door portion 18 may be controlled. Hinge line 24 preferably comprises a continuous line of reduced cross-sectional thickness, a discontinuous line of reduced cross-sectional thickness, or a plurality of slots extending through the thickness of lower retainer 14.

Figure 4:
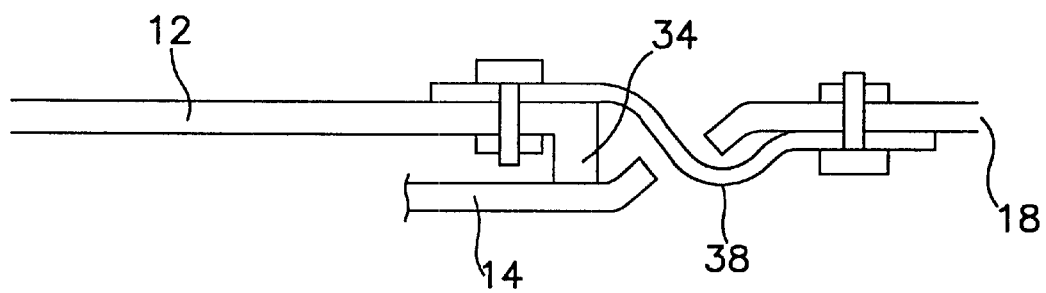
FIG. 4 illustrates the hinge of the airbag door portion of the substrate in an enlarged cut-away view.

The opening characteristics of the airbag door may be further improved by the addition of hinge/tether 38, illustrated in enlarged view FIG. 4. Preferably hinge/tether 38 is manufactured from woven fabric, and may be used to further define the hinge action of the opening of airbag door, to tether airbag door portion 18 such that it remains attached to instrument panel substrate 10 during and after opening of the airbag, or as an energy management device for the airbag door. Alternately, hinge/tether 38 may comprise a metal or plastic member. Hinge/tether 38 is preferably attached to the upper surface of upper retainer 12 and to the lower surface of airbag door portion 18, passing through a plurality of slots along hinge line 24. Alternate attachment configurations of hinge/tether 38 include attachment to the upper surface of upper retainer 12 and the upper surface of airbag door portion 18, attachment to the lower surface of lower retainer 14 and the lower surface of airbag door portion 18, and attachment to the lower surface of lower retainer 14 and the upper surface of airbag door portion 18.

The opening characteristics of airbag door portion 18 may be further modified and controlled through the use of reinforcing features 40 disposed on airbag door portion 18. Preferably reinforcing features 40 comprise a plurality of parallel channels extending perpendicular to hinge line 24. Reinforcing features 40 are contained on airbag door portion 18 beginning after hinge line 24 and terminating before the opposing edge. Preferably reinforcing features 40 have a half-round cross-sectional profile, however any profile that serves to increase the section modulus and relative stiffness of airbag door portion 18 is suitable.

Figure 3:
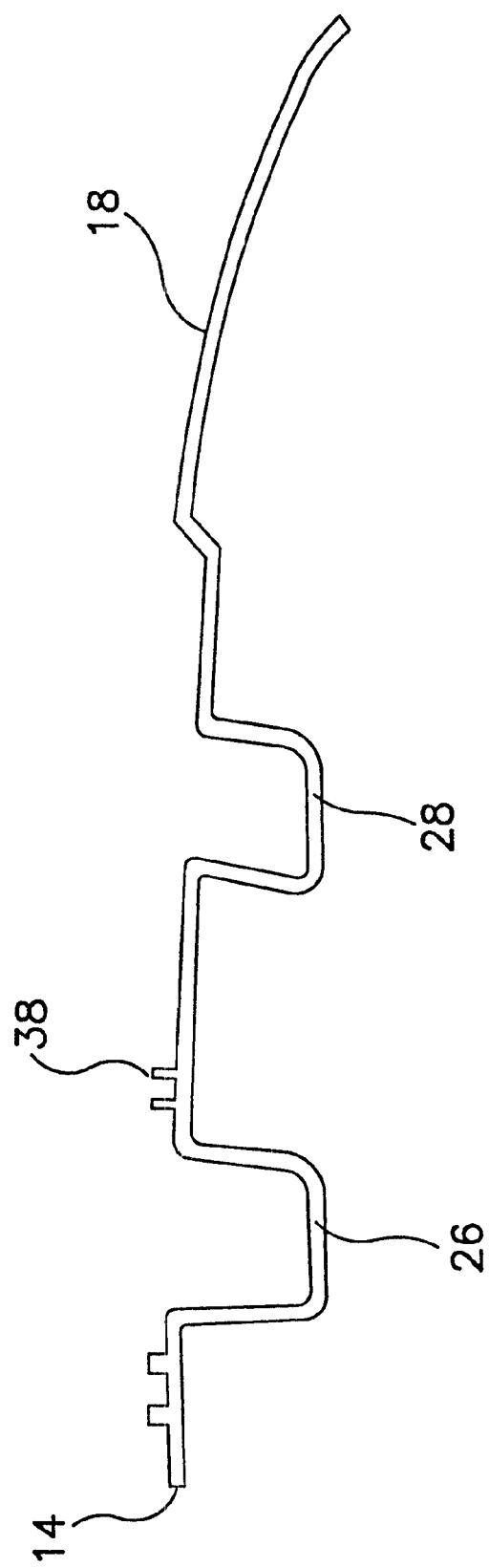
FIG. 3 illustrates the lower retainer of the instrument panel substrate in a section view taken along line A—A of FIG. 1.

As shown in FIGS. 1–3, in addition to airbag door portion 18, lower retainer 14 comprises integral channels 26 and 28. As illustrated, channels 26 and 28 are upwardly opening, i.e. opening toward the inner (i.e. underside) surface of upper retainer 12. When lower retainer 14 having channels 26 and 28 is assembled to upper retainer 12 channels 26 and 28 are substantially, and preferably completely, closed about at least a portion of their length, thereby defining ducts 30 and 32.

Alternately, ducts 30 and 32 may be defined by channels projecting off of upper retainer inner surface, the channels being closed about at least a portion of their length by lower retainer upper surface. Also alternatively, ducts 30 and 32 may be defined by coordinated channels projecting from both upper retainer inner surface and lower retainer upper surface, wherein the coordinated channels align with each other about at least a portion of their length. Also alternatively, ducts 30 and 32 may be defined by a substantially L-shaped structure provided by both upper retainer 12 and lower retainer 14.

Channels 26 and 28 are shown in FIGS. 1–3 as being cross-car channels, i.e. extending longitudinally along lower retainer 14 from one side of the vehicle to the other side of the vehicle. Alternately, channels 26 and 28 my be oriented in a front to back arrangement, with respect to the length of the car, or the channels 26 and 28 may be angled across lower retainer 14. Additionally, channels 26 and 28 may be arranged in any combination of the above detailed orientations. Along the same lines, channel 26 and 28 may each have a different orientation. Finally, while two channels are shown in the figures, lower retainer 14 may contain any number of channels as required.

The cross-sectional profile of channels 26 and 28 is largely controlled by the application requirements and molding considerations. Suitable profiles include, but are not limited to, rectangular, trapezoidal, half-oval, and half-round. The size of channels 26 and 28, that is the cross-sectional area, is also determined by the specific application requirements, and therefore should not be considered limitative on the present invention.

Ducts 30 and 32 may be employed for a variety of uses. The applications of ducts 30 and 32 include, but are not limited to, HVAC (heating ventilation air conditioning) ducts, wiring conduits, structural members, etc. Preferably, ducts 30 and 32 may be applied to a plurality of functions by integrating a plurality of channels of varying pathways and configurations into lower retainer 14.

When the ducting system, or an individual duct, is employed for use with the automobile's HVAC it is preferred that, for better efficiency, channels 26 and 28 are sealed to upper retainer 12 in a substantially air-tight manner. Furthermore, it is preferred that ducts 30 and 32 have at least one air inlet providing air from a blower or fan. Most preferably at least one of ducts 30 and 32 are in fluid communication with the vehicle HVAC module. It is also preferred that at least one of ducts 30 and 32 has at least one air outlet into the passenger compartment or towards the windshield. The air outlet may include an air-vent register, in fluid communication with a duct 30, or 32 to direct the flow of air into the passenger compartment. Longitudinal ducts may ideally be employed for use with the defroster system, instrument panel vents, or floor vents. While it is preferred that integrated ducts compose the entire HVAC ducting network, additional, non-integral, ducts may be used for connection of the integrated ducts to the vehicle HVAC module, to one another, and/or to the inlets as discussed above air outlets into the passenger compartment. If the entire HVAC system is to be composed entirely of integrated ducts, consideration should be taken for the addition of damper systems, as are known in the art.

In addition to forming integral HVAC ducting, the ducts 30 and 32 of lower retainer 14 may be used to form wiring conduits. The integration of wiring conduits into the instrument panel provides a convenient method for routing wires and electrical connections to the various components contained within the instrument panel of an automobile, such as instruments, HVAC controls, radios and airbags. The open faced nature of channels 26 and 28, prior to assembly of upper retainer 12 and lower retainer 14, allow the wiring conduits to be routed as required by the positioning of the electrical components and, as with HVAC ducts, wiring conduit runs may be configured according to the design criteria of the application.

In the final preferred embodiment, integral ducts 30 and 32 may be used as structural members, either as cross-car structural members for stiffening the body of the automobile, or as stiffening members for rigidifying the instrument panel. When used as structural members, especially as cross-car structural members, the ducts 30 and 32 may be filled with a structural and/or reinforced foam. Alternately, lower retainer 14 and/or upper retainer 12 may comprise a reinforced polymeric material. Fiberglass is an exemplary reinforcing agent.

There are a variety of possible means for attaching lower retainer 14 to the inner surface of upper retainer 12. Most preferred among the possible techniques are thermal welding, such as ultrasonic welding and/or vibration welding. Ultrasonic and vibration welding preferably utilized a plurality of energy concentrators 38 positioned on lower retainer 14 adjacent both sides of each channel 26 and 28. Alternately energy concentrator 38 may by disposed on upper retainer 12. Depending upon the application and securement requirements, energy concentrator 38 may be positioned other than on both sides of channels 26 and 28. It is preferred that energy concentrator 38 comprise ribs extending from lower retainer 14. The efficiency of vibration welding and ultrasonic welding may be further improved by terminating energy concentrator 38 in a point. Preferably, energy concentrator 38 may be a discontinuous rib or a plurality of nodules.

In alternate embodiments securement of lower retainer 14 to upper retainer 12 may be accomplished through methods other than ultrasonic and vibration welding. Alternate means of securement include, but are not limited to, adhesive bonding using an adhesive; heat staking of heat stake pins or bosses; mechanical fastening, such as screws, rivets snap fits, snap tabs, etc. Additionally, securement of lower retainer 14 to upper retainer 12 may be aided by features such as tongue and groove fits, especially when the ducts should be substantially air-tight as for HVAC ducts, and may utilize a combination of attachment means.

In other embodiments, substrate 10 may be used for a door panel, quarter panel, package tray, headliner, close-out panel or any other vehicle interior trim panel.

What is claimed is:

1. An automotive trim panel comprising an airbag door and at least one duct, the panel comprising:

a first retainer having a first retainer upper surface, and first retainer inner surface and an aperture for deployment of an airbag;

a second retainer having a second retainer upper surface, a second retainer inner surface and an airbag door portion, said airbag door portion within the aperture; and at least one duct having a length and formed between the first retainer and the second retainer.

2. The automotive trim panel of claim 1, wherein the duct comprises at least one channel in the second retainer closed about at least a portion of its length by the first retainer inner surface.

3. The automotive trim panel of claim 1, wherein the duct comprises at least one channel in the first retainer closed about at least a portion of its length by the second retainer upper surface.

4. The automotive trim panel of claim 1, wherein the duct comprises at least one channel in the second retainer and at least one channel in the first retainer, wherein said channel in the second retainer and said channel in the first retainer are aligned with each other about at least a portion of their length.

5. The automotive trim panel of claim 1, wherein the duct comprises a substantially L-shaped structure provided by both the second retainer and the first retainer.

6. The automotive trim panel of claim 1, wherein the duct is in fluid communication with a heating, ventilation, or air-conditioning system of a vehicle.

7. The automotive trim panel of claim 1, wherein the duct is a component of a heating, ventilation, or air-conditioning system of a vehicle.

8. The automotive trim panel of claim 1, wherein the duct further comprises at least one inlet and at least one outlet.

9. The automotive trim panel of claim 8, wherein the duct directs a flow of air from the inlet to the outlet.

10. The automotive trim panel of claim 8, wherein the duct directs a flow of air from the outlet towards the windshield of a vehicle.

11. The automotive trim panel of claim 8, wherein the duct directs a flow of air from the outlet into the passenger compartment of a vehicle.

12. The automotive trim panel of claim 8, wherein the outlet farther includes a vent for directing the flow of air.

13. The automotive trim panel of claim 8, wherein the duct receives a flow of air into the inlet from a blower.

14. The automotive trim panel of claim 8, wherein the duct directs wire from the inlet to the outlet.

15. The automotive trim panel of claim 1, wherein the duct is at least partially filled with foam.

16. The automotive trim panel of claim 1, wherein said lower retainer airbag door portion is substantially coextensive with said first retainer aperture.

17. The automotive trim panel of claim 1, wherein said second retainer airbag door portion is received in said first retainer aperture and is substantially coplanar with said first retainer.

18. The automotive trim panel of claim 1, wherein said first retainer aperture further comprises a perimeter and a lip projection into said aperture about at least a portion of the perimeter of said aperture.

19. The automotive trim panel of claim 1, wherein said second retainer airbag door portion is delineated by a hinge line.

20. The automotive trim panel of claim 19, wherein said hinge line is a line of mechanical weakness, wherein said line of mechanical weakness is a reduction in cross-sectional thickness.

21. The automotive trim panel of claim 20, wherein said line of mechanical weakness comprises a plurality of slots.

22. The automotive trim panel of claim 19 further comprising a tether disposed across said hinge line.

23. The automotive trim panel of claim 22, wherein said tether comprises a metallic member.

24. The automotive trim panel of claim 22, wherein said tether comprises a fabric member.

25. The automotive trim panel of claim 1, wherein the first retainer and the second retainer are constructed of polymeric materials.

26. The automotive trim panel of claim 25, wherein the polymeric material of the second retainer has a lower glass transition temperature than the polymeric material of the first retainer.

27. The automotive trim panel of claim 25, wherein the polymeric material of the second retainer has a lower flexural modulus than the polymeric material of the first retainer.

28. The automotive trim panel of claim 1, wherein said trim panel further comprises a layer of foam adhered to the first retainer upper surface.

29. The automotive trim panel of claim 28, wherein said trim panel further comprises a skin layer adhered to the foam layer.

30. The automotive trim panel of claim 29, wherein said foam and skin layers are continuous about the upper surface of the trim panel.

31. A method for producing an automotive trim panel having an airbag door and ducts, the method comprising the steps of:
   providing a first retainer having a first retainer inner surface, and first retainer upper surface, and an aperture for deployment of an airbag;
   providing a second retainer having a second retainer inner surface, a second retainer upper surface, and an airbag door portion;
   introducing said airbag door portion of said second retainer to said aperture of said first retainer;
   forming a duct between the first retainer and the second retainer;
   assembling said first retainer to said second retainer.

32. The method of claim 31, including the steps of:
   providing a first retainer further comprising an aperture perimeter and a lip about at least a portion of the perimeter of the aperture;
   inserting the airbag door portion of the second retainer into the aperture of the first retainer;
   rotating the second retainer relative to said first retainer to bring at least a portion of the airbag door portion of the second retainer into contact with at least a portion of the lip of the first retainer.

33. The method of claim 31, where said step of assembling said first retainer to said second retainer comprises thermal welding.

34. The method of claim 31, where said step of assembling said first retainer to said second retainer comprises vibration welding.

35. The method of claim 31, where said step of assembling said first retainer to said second retainer comprises ultrasonic welding.

36. The method of claim 31, where said step of assembling said first retainer to said second retainer comprises heat staking.

37. The method of claim 31, where said step of assembling said first retainer to said second retainer comprises adhesive bonding.

38. The method of claim 31, where said step of assembling said first retainer to said second retainer comprises mechanical fastening.

* * * * *